US010925427B2

(12) United States Patent
Lewis

(10) Patent No.: US 10,925,427 B2
(45) Date of Patent: Feb. 23, 2021

(54) PRIVACY CURTAIN SYSTEM

(71) Applicant: Lisa S. Lewis, Manteca, CA (US)

(72) Inventor: Lisa S. Lewis, Manteca, CA (US)

( * ) Notice: Subject to any disclaimer, the term of this patent is extended or adjusted under 35 U.S.C. 154(b) by 268 days.

(21) Appl. No.: 16/122,849

(22) Filed: Sep. 5, 2018

(65) Prior Publication Data

US 2020/0069101 A1 Mar. 5, 2020

(51) Int. Cl.
*A47H 23/00* (2006.01)
*A47H 99/00* (2009.01)
*A47H 1/18* (2006.01)
*F16B 45/00* (2006.01)
*F16B 47/00* (2006.01)

(52) U.S. Cl.
CPC ............ *A47H 23/00* (2013.01); *A47H 1/18* (2013.01); *F16B 45/00* (2013.01); *F16B 47/00* (2013.01); *A47H 2201/02* (2013.01)

(58) Field of Classification Search
CPC .......... A47H 23/10; A47H 21/00; A47H 1/00; A47H 23/00; A47H 1/18; A47H 2201/02; A47H 13/14; A47H 99/00; A47K 3/38; F16B 45/00; F16B 47/00
See application file for complete search history.

(56) References Cited

U.S. PATENT DOCUMENTS

| | | | | | |
|---|---|---|---|---|---|
| 1,500,991 | A | * | 7/1924 | Heitler | A47K 3/38 4/608 |
| 2,303,502 | A | * | 12/1942 | Rous | A47K 3/38 24/334 |
| 2,613,368 | A | * | 10/1952 | Rosenbaum | A47K 3/38 4/608 |
| 4,279,396 | A | * | 7/1981 | Bendock | A47K 3/38 24/530 |
| 5,437,061 | A | * | 8/1995 | Kenner | A41D 3/08 2/69 |
| D370,583 | S | * | 6/1996 | Fiddler | D6/575 |
| 5,676,288 | A | * | 10/1997 | Spirk | B62J 19/00 150/167 |
| 5,761,751 | A | * | 6/1998 | Morrissey | A47K 3/38 4/558 |
| 7,000,674 | B1 | * | 2/2006 | Johnson | A47H 19/00 160/330 |
| 10,433,678 | B1 | * | 10/2019 | Peters | A47K 1/09 |
| 2006/0242758 | A1 | * | 11/2006 | Hall | A47K 3/28 4/601 |
| 2009/0083904 | A1 | * | 4/2009 | Roston | A47K 3/38 4/558 |
| 2009/0151068 | A1 | * | 6/2009 | Rice | A47K 3/38 4/558 |

(Continued)

*Primary Examiner* — Daniel P Cahn

(57) ABSTRACT

A privacy curtain system comprises a curtain, the curtain having a top, a bottom, and two sides that are of greater length than the top and bottom. The curtain comprising a plurality of apertures near the top of the curtain. The privacy curtain system further comprises an installation system comprising a plurality of fasteners that each engage with one of the apertures in the curtain to support the curtain. The plurality of fasteners comprises at least one hook of a first type and at least one hook of a second type that is different than the first type. The privacy curtain system can be portably towed and installed across gaps in a bathroom stall independent of the configuration of the bathroom stall.

9 Claims, 3 Drawing Sheets

(56) References Cited

U.S. PATENT DOCUMENTS

| | | | |
|---|---|---|---|
| 2010/0108210 A1* | 5/2010 | Salas Garcia | A47H 21/00 150/154 |
| 2011/0186247 A1* | 8/2011 | Wild | B60J 9/00 160/351 |
| 2014/0231277 A1* | 8/2014 | Ponski | A45F 5/02 206/38 |
| 2017/0196380 A1* | 7/2017 | Chapman | A47K 3/38 |
| 2018/0255979 A1* | 9/2018 | Moore | A47K 3/38 |
| 2019/0374070 A1* | 12/2019 | Paige | A47K 3/38 |
| 2019/0380545 A1* | 12/2019 | Bradbury | A47K 3/286 |

* cited by examiner

PRIVACY CURTAIN SYSTEM

BACKGROUND

Is a little privacy too much to ask for when one is utilizing public bathroom facilities? It often seems to be when bathroom stalls are so poorly designed as to cause large spaces along the sides of the stall door. As a result, anyone in the bathroom can inadvertently, or worse advertently, peep through the crack and see the person on the toilet.

Those in search of privacy in a bathroom stall have had few options up to now. Some bathroom stalls are equipped with permanently installed strips that cover the gaps in the stall. However, these strips are not available in all stalls and of course only provide privacy in the stalls where they are installed. They may provide a user some temporary privacy, but as soon as the user goes to a different bathroom facility where the strips are not provided, the privacy is gone. Furthermore, the strips are expensive to install and can become damaged and fall off. Moreover, anyone intent on pervertedly peeping through the cracks would not be hanging out in a bathroom equipped with the strips.

In most situations, a person that needs to use the bathroom in public does not have the luxury of searching out for bathroom facilities that have small or covered gaps beside the door. Usually a person in need of going is going to go in the closest facility available. If the closest facility has wide spaces beside the door, then the person is at risk of being peeped upon.

Therefore, there is a need for a way for a bathroom stall user to cover the gap next to the stall door and/or between stall panels. There is further a need to provide a gap cover that fits multiple bathroom stall configurations. There is further a need to provide a portable and convenient gap cover.

SUMMARY

The present invention satisfies these needs. In one aspect of the invention, a way for a bathroom stall user to cover gaps in the stall is provided.

In another aspect of the invention, a privacy curtain is provided that is installable by a user in a bathroom stall to cover gaps in the stall.

In another aspect of the invention, a privacy curtain is easily installable in multiple bathroom stall configurations.

In another aspect of the invention, a bathroom stall privacy curtain is provided that is portable.

In another aspect of the invention, a privacy curtain system comprises a curtain, the curtain having a top, a bottom, and two sides that are of greater length than the top and bottom, the curtain comprising a plurality of apertures near the top of the curtain. An installation system comprises a plurality of fasteners that each engage with one of the apertures in the curtain to support the curtain, wherein the plurality of fasteners comprises at least one hook of a first type and at least one hook of a second type that is different than the first type. The privacy curtain system can be portably towed and installed across gaps in a bathroom stall independent of the configuration of the bathroom stall.

In another aspect of the invention, a method of increasing privacy in a bathroom stall comprises stowing a privacy curtain system in a portable pocket, carrying a privacy curtain system into the bathroom stall, the privacy curtain system comprising a curtain and an installation system, after closing the door to the bathroom stall, installing the curtain in the bathroom stall using the installation system so that the curtain at least partially covers a gap in the bathroom stall, before leaving the bathroom stall, uninstalling the curtain and returning the curtain and installation system, and returning the curtain and installation system to the portable pocket. The installation system comprises a plurality of fasteners.

In another aspect of the invention, a method of making a privacy curtain system comprises providing a rectangular piece of fabric, folding the bottom of the piece of fabric over itself, inserting a pocket having a closure into the fold, sewing the fold so that the pocket is permanently contained within the fold, and folding the fabric and inserting it into the pocket, inserting an installation system comprising a plurality of fasteners into the pocket, and securing the curtain and the installation system in the pocket by closing the closure.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

Figure 1A:
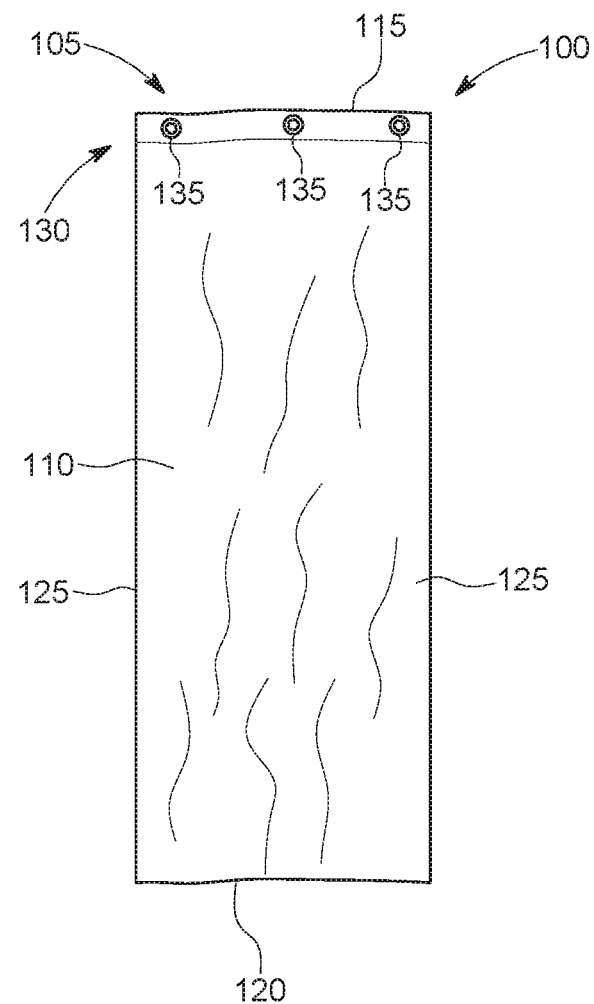
FIG. 1A is a schematic front view of curtain of a privacy curtain system according to a version of the invention.

The present invention relates to a privacy curtain system. In particular, the invention relates to a portable privacy curtain system that can be easily carried and installed by a user. Although the invention is illustrated and described in the context of being useful for covering gaps in a bathroom stall, the present invention can be used in other ways, as would be readily apparent to those of ordinary skill in the art. Accordingly, the present invention should not be limited just to the examples and embodiments described herein.

FIG. 1 shows a portion of a version of a privacy curtain system 100 according to the invention. The privacy curtain system 100 includes a curtain 105. The curtain 105 is an elongated piece of flexible material, such as fabric or plastic, that is sufficiently long and wide to cover one or more gaps in a bathroom stall and that is sufficiently opaque to prevent anyone from seeing through the covered gaps that could otherwise be seen through. Bathroom stall gaps can occur between the stall door and an adjacent panel, between a stall door and a wall, between adjacent panels, between a panel and a wall, or anywhere else in the stall where there is damage or faulty construction or design. By installing the curtain 105 in a position where it covers the one or more gaps, the user of the bathroom stall can block the gaps from being peeped through and can thereby gain a greater sense of privacy.

In one version, the privacy curtain system 100 includes a curtain 105 that is designed to be easily portable and stowable while being optimally sized and shaped for its purpose. For example, the curtain 105 has a panel 110 that is made of one or more of nylon, cordura, and polyester, and in one particular version is made of ripstop nylon. The panel 110 in the version of FIG. 1A has a rectangular shape with a top end 115, a bottom end 120, and two elongated sides 125. The top end 115 and the bottom end 120 are sufficiently long to span the one or more gaps that are to be covered. For example, the top end and the bottom end may be from about 5 inches to 15 inches, more preferably from about 9 inches to about 12 inches, and most preferably about 14 inches. The length of the sides 125 may be from about 30 inches to about 60 inches, more preferably from about 42 inches to about 52 inches, and most preferably about 48 inches. In one version, the panel 100 is sufficiently flexible to be easily foldable so that it may be conveniently stored. In this version, the panel 100 made of ripstop nylon having a fabric weight of from about 1.1 ounce to about 1.9 ounces. The thickness and fabric weight can be adjusted based on the material used. In other versions, the panel 110 can take other non-rectangular shapes. For example, the panel may be trapezoidal or other polygonal shape, may be round or oval, and/or may have rounded or curved sides.

Figure 1B:
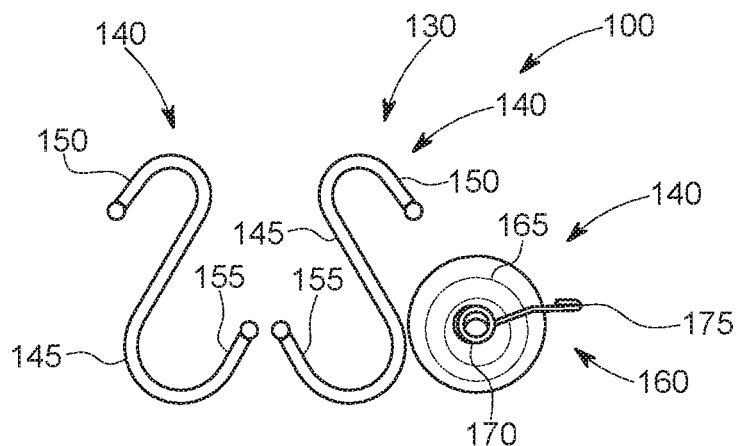
FIG. 1B is a schematic front view of components of an installation system of a privacy curtain system according to a version of the invention.

As shown in FIGS. 1A and 1B, the privacy curtain system 100 also includes an installation system 130 that allows the curtain 105 to be easily installed in a bathroom stall. In the version of FIGS. 1A and 1B, the installation system 130 is made up of a plurality of apertures 135 in the panel 110 of the curtain 105. The apertures 135 can be in the form of grommets, as shown, or in any other form. A corresponding number of fasteners, such as hooks 140 are provided. Each hook 140 may be hooked through an aperture 135 in the curtain 105 so the curtain can be hung from the stall. The installation system 130 may include one or more S-shaped hooks 145. The S-shaped hooks 145 have a first end 150 for attachment to an aperture 135 and a second end 155 that is sized and shaped to be able to hook over the top of a bathroom stall door or panel. The installation system 130 may include one or more suction hooks 160. The suction hook 160 includes a suction cup 165 that may be attached by suction to a stall door or panel or to a wall. Extending from the suction cup 165 is a protrusion 170 on which hangs a protrusion hook 175 that has a hook portion that can be inserted into an aperture 135 in the curtain 105. The suction hooks 160 are useful in situations when the panel or wall extends to the ceiling and thus does not have a top that an S-shaped hook 145 can hook onto. In an alternative version, the hooks or the like can be permanently attached to the curtain 105.

The installation system 130 can have any number of apertures 135 and hooks 140. For example, the installation system 130 can be made up of two or more apertures 135 and corresponding hooks 140, three or more apertures 135 and corresponding hooks 140, or four or more apertures 135 and corresponding hooks 140. In one particular version, such as the one shown in FIGS. 1A and 1B, it has been determined that a three aperture 135 system works well to provide sufficient coverage of one or more gaps in a bathroom stall while maintaining a convenient installation process. In this version, the privacy curtain system 100 is made up of a curtain 105 having three apertures 135 and with at least three hooks 140. The hooks 140 may all be of the same type or may be a combination of different types of hooks. Often bathroom stall doors and panels do not extend all the way to the ceiling. For these, three S-shaped hooks 145 would be sufficient. However, when the panels extend to the ceiling or when the stall is adjacent to a wall, the S-shaped hooks 145 would not be desirable. Accordingly, for these situations, it is useful to have one or more suction hooks 160. In one particular version, as shown in FIG. 1B, it has been discovered that a combination of two S-shaped hooks 145 and one suction hook 160 provides a suitable installation system 130 for nearly all bathroom stall configurations. The S-shaped hooks 145 can be hung from the door or panel having a suitable top, and the suction hook 160 can be attached to a panel or wall that does or does not extend to the ceiling.

Figure 2:
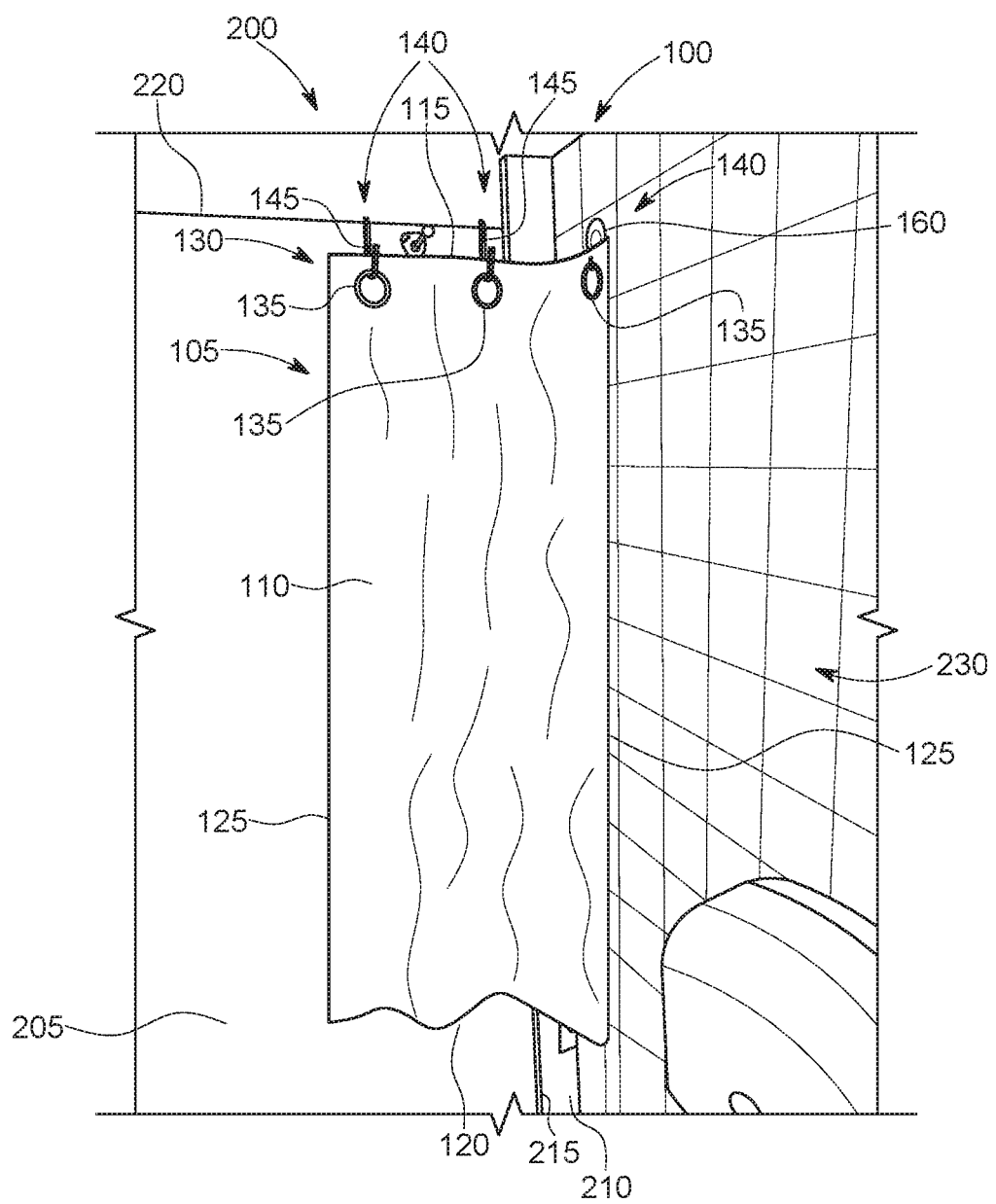
FIG. 2 is schematic showing a privacy curtain system installed in a bathroom stall.

A privacy curtain system 100 is shown in FIG. 2 installed in a bathroom stall environment 200. The bathroom stall 200 has a stall door 205 and an adjacent panel 210. As can be seen, a gap 215 exists between the door 205 and the panel 210. Without protection, a person outside the stall 200 can peep through the gap 215 and see a person sitting on a toilet in the stall 200. However, by installing the privacy curtain system 100 of the present invention, the ability to see through the gap is greatly diminished.

The bathroom stall configuration in the stall 200 shown in FIG. 2 has a door 205 with a top 220 on which the hooks 140 can be hung. The panel 210 and the side wall 230 of the stall 200 extend to the ceiling. Accordingly, a suction hook 160 is used along the wall 230 or on the panel 210 to provide an additional mount for the curtain 205. To use the privacy curtain system 100, a user merely enters the stall 200 and closes the door 205. The user then unfolds the curtain 105, installs the hooks 140 to the top 220 of the door 205 or to the side of the wall 230 or panel 210 and inserts the hooks into the apertures 135 in the curtain 105.

Figure 3A:
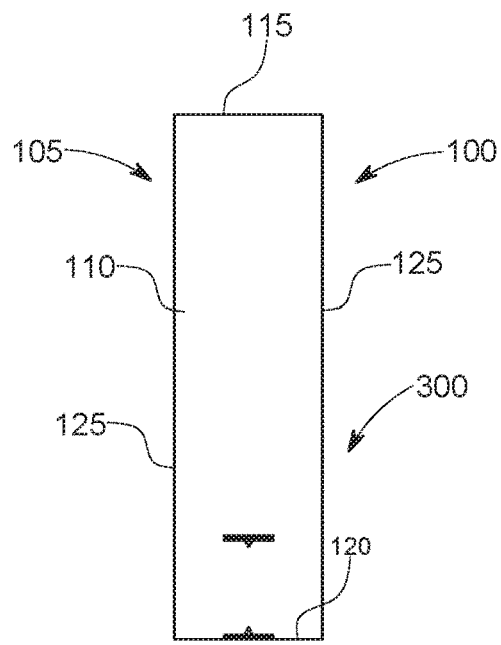
FIG. 3A is a schematic showing a pattern for making a self-contained version of a privacy curtain system according to a version of the invention.
Figure 3B:
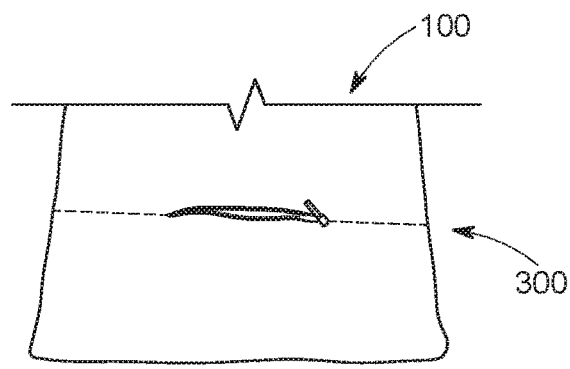
FIG. 3B is a schematic showing a step in the making of the self-contained version of the privacy curtain system of FIG. 3A.
Figure 3C:
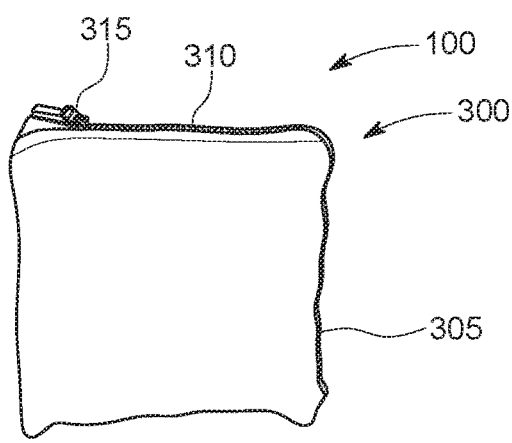
FIG. 3C is a schematic showing the self-contained version of the privacy curtain system of FIG. 3A in its self-contained mode.

In one version of the privacy curtain system 100, a self-contained system 300 can be provided for containing the curtain 105 and the installation system 130. A version of the self-contained system 300 is shown in FIGS. 3A through 3C. As can be seen in FIG. 3C, the self-contained system 300 forms a pocket 305 into which the curtain 105 and installation system 130 can be inserted. The pocket 305 is closable by a closure 310 such as a zipper 315. The self-contained system 300 and pocket 305 can be formed as shown in FIGS. 3A and 3B. First a pattern is cut in the fabric of choice. In one version, the fabric cut can be about 39 cm by about 139 cm. This allows for a 2 cm hem allowance on sides, a 4 cm hem allowance at the top, a 1 cm hem allowance at the bottom, and a 13 cm allowance for the pocket. The bottom is folded over at the markings shown in FIG. 3A, as shown in FIG. 3B. The pocket material is then sewn into the fold. A detailed step by step process in accordance with one version of making the curtain comprises the following steps:

1) Fold 1 cm and iron flat on one side 125. Repeat once more for a rolled hem.
2) Repeat on other side 125.
3) Stitch both hems down.
4) Fold top 115 down 2 cm. Repeat for a rolled hem.
5) Stitch top seam down.
6) Fold bottom 120 up 1 cm.
7) Fold bottom 120 up by 13 cm.
8) Stitch sides of bottom hem.
9) Mark the center in the bottom hem on both the pocket side and curtain side of the hem.
10) Fold pocket fabric in half, right side together, creating a 13 cm×13 cm square pocket.

11) Sew a 1 cm seam allowance along the side leaving a 1 cm space from the top edge. This will create a pocket with the wrong-side of the fabric facing out.

12) Sew a zipper to the inside of the pocket with a 1 cm seam allowance.

13) Fold zipper edge out and mark the center of the pocket on both sides.

14) Insert pocket into curtain hem and pin the centers together.

15) Sew along the zipper edge on the curtain and pocket side.

16) Sew along the zipper edge on the hem and pocket side.

17) Finish sewing the remaining hem.

Although the privacy curtain system 100 has been describe in its usefulness in a bathroom stall environment, it can be used in other environments. For example, the privacy curtain system 100 can be used for separation of space in dorm rooms, in multi-resident housing, in recreational vehicles, and the like.

In another version of the invention, rather than being portably carried from bathroom stall to bathroom stall, the privacy curtain system 100 can be permanently installed in a bathroom stall. For example, the curtain 105 can hang from a plurality of hooks installed on one side of the stall or a wall. One or more hooks can also be provided on the door. After a user enters the stall, the user can remove one of the apertures 135 from a hook, extend the curtain 105 across the gap 215, and slide the aperture over the one or more hooks on the door. When the user is finished, the user can move the curtain 105 to its original position and leave the stall with the curtain 105 ready for use by the next user.

In another version, the privacy curtain system 100 can comprise an installation system 130 having hooks that are permanently attached to the curtain 105. To install the curtain 105, the hooks can be hooked over the door or panel in the stall or suctioned onto a wall, panel or door. The manner of attachment can also take any of various forms, such as Velcro fasteners, pins, adhesives, and the like.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. A method of increasing privacy in a bathroom stall, the method comprising:
   stowing a privacy curtain system in a portable pocket;
   carrying a privacy curtain system into the bathroom stall having a door, the privacy curtain system comprising a curtain and an installation system;
   after closing the door to the bathroom stall, installing the curtain in the bathroom stall using the installation system so that the curtain at least partially covers a gap in the bathroom stall;
   before leaving the bathroom stall, uninstalling the curtain; and
   returning the curtain and installation system to the portable pocket, wherein the installation system comprises a plurality of fasteners.

2. A method according to claim 1, wherein at least two of the fasteners are of a different type.

3. A method according to claim 1, wherein at least one of the fasteners is an S-shaped hook and at least one of the fasteners is a hook attached to a suction cup.

4. A method according to claim 1, wherein at least two of the fasteners is an S-shaped hook and at least one of the fasteners is a hook attached to a suction cup.

5. A method according to claim 1, wherein the portable pocket is permanently attached to the curtain.

6. A method of increasing privacy in a bathroom stall, the method comprising:
   stowing a privacy curtain system in a portable pocket;
   carrying a privacy curtain system into the bathroom stall having a door, the privacy curtain system comprising a curtain and an installation system;
   after closing the door to the bathroom stall, installing the curtain in the bathroom stall using the installation system so that the curtain at least partially covers a gap in the bathroom stall;
   before leaving the bathroom stall, uninstalling the curtain; and
   returning the curtain and installation system to the portable pocket,
   wherein the installation system comprises an S-shaped hook.

7. A method according to claim 6 wherein the installation system further comprises a hook attached to a suction cup.

8. A method of increasing privacy in a bathroom stall, the method comprising:
   stowing a privacy curtain system in a portable pocket;
   carrying a privacy curtain system into the bathroom stall having a door, the privacy curtain system comprising a curtain and an installation system;
   after closing the door to the bathroom stall, installing the curtain in the bathroom stall using the installation system so that the curtain at least partially covers a gap in the bathroom stall;
   before leaving the bathroom stall, uninstalling the curtain; and
   returning the curtain and installation system to the portable pocket,
   wherein the installation system comprises a hook attached to a suction cup.

9. A method according to claim 8 wherein the installation system further comprises a hook not attached to a suction cup.

* * * * *